United States Patent
Anand

(10) Patent No.: US 11,228,603 B1
(45) Date of Patent: Jan. 18, 2022

(54) LEARNING DRIVEN DYNAMIC THREAT TREATMENT FOR A SOFTWARE DEFINED NETWORKING ENVIRONMENT

(71) Applicant: Juniper Networks, Inc., Sunnyvale, CA (US)

(72) Inventor: Ajay Anand, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 202 days.

(21) Appl. No.: 16/144,965

(22) Filed: Sep. 27, 2018

(51) Int. Cl.
  *G06N 20/00* (2019.01)
  *H04L 29/06* (2006.01)
  *G06N 7/00* (2006.01)

(52) U.S. Cl.
  CPC ......... *H04L 63/1416* (2013.01); *G06N 7/005* (2013.01); *G06N 20/00* (2019.01)

(58) Field of Classification Search
  CPC ..... H04L 63/1416; G06N 20/00; G06N 7/005
  See application file for complete search history.

(56) References Cited

U.S. PATENT DOCUMENTS

| | | | | |
|---|---|---|---|---|
| 2014/0068769 A1* | 3/2014 | Neil | ...................... | G06N 7/005 726/23 |
| 2016/0080417 A1* | 3/2016 | Thomas | .............. | H04L 63/1416 726/1 |
| 2016/0212172 A1* | 7/2016 | Senanayake | ........ | G06F 3/04815 |
| 2016/0217377 A1* | 7/2016 | Senarath | ............. | G06F 16/9537 |
| 2016/0219078 A1* | 7/2016 | Porras | ...................... | H04L 41/12 |
| 2017/0054738 A1* | 2/2017 | Avidan | ................ | H04L 63/1416 |
| 2017/0331842 A1* | 11/2017 | Kikuchi | .................. | H04L 47/32 |
| 2017/0331853 A1* | 11/2017 | Kawakita | ............ | H04L 63/1416 |
| 2018/0198800 A1* | 7/2018 | Krasser | .................. | H04L 63/145 |
| 2018/0248905 A1* | 8/2018 | Cote | ....................... | G06F 17/18 |
| 2018/0288126 A1* | 10/2018 | Smart | ..................... | H04L 43/08 |
| 2018/0343176 A1* | 11/2018 | Hui | ..................... | H04L 43/0888 |
| 2019/0158514 A1* | 5/2019 | Huang | .................. | G06F 21/552 |

FOREIGN PATENT DOCUMENTS

WO  WO-2012123970 A2 *  9/2012  ......... H04L 63/1416

OTHER PUBLICATIONS

"Contrail Security" Data Sheet, Juniper Networks, Inc, Apr. 20, 2018, 4 pp.

(Continued)

*Primary Examiner* — Yonas A Bayou
(74) *Attorney, Agent, or Firm* — Shumaker & Sieffert, P.A.

(57) ABSTRACT

Techniques are disclosed for providing dynamic threat treatment for a software defined networking (SDN) environment. In one example, a software defined networking controller comprises one or more processors, wherein the one or more processors are configured to: determine that a security device of a network has detected a threat; apply the threat to a threat treatment model, wherein the threat treatment model is generated based on threat treatment information that includes one or more steps used to resolve previous instances of the threat or previous instances of similar threats; and generate one or more treatment processes to resolve the threat based on the threat treatment model.

18 Claims, 7 Drawing Sheets

(56) References Cited

OTHER PUBLICATIONS

"Reinforcement Learning" Wikipedia, last edited Sep. 27, 2018, available at https://en.wikipedia.org/wiki/Reinforcement_learing, ast accessed Sep. 27, 2018, 11 pp.

"Hidden Markov model" Wikipedia, last edited Sep. 4, 2018, available at https://en.wikipedia.org/wiki/Hidden_Markov_model, last accessed Sep. 27, 2018, 19 pp.

"Temporal Difference Learning" Wikipedia, last edited Jun. 16, 2018, available at https://en.wikipedia.org/wiki/Temporal_difference_learning, last accessed Sep. 27, 2018, 4 pp.

"Viterbi algorithm" Wikipedia, last edited Sep. 24, 2018, available at https://en.wikipedia.org/wiki/Viterbi_algorithm, last accessed Sep. 27, 2018, 8 pp.

"Bayesian network" Wikipedia, last edited Sep. 7, 2018, available at https://en.wikipedia.org/wiki/Bayesian_network, last accessed Sep. 27, 2018, 14 pp.

"Dynamic Programming" Wikipedia, last edited Sep. 26, 2018, available at https://en.wikipedia.org/wiki/Dynamic_programming, last accessed Sep. 27, 2018, 19 pp.

"Markov decision process" Wikipedia, last edited Sep. 21, 2018, available at https://en.wikipedia.org/wiki/Markov_decision_process, last accessed Sep. 27, 2018, 11 pp.

* cited by examiner

LEARNING DRIVEN DYNAMIC THREAT TREATMENT FOR A SOFTWARE DEFINED NETWORKING ENVIRONMENT

TECHNICAL FIELD

This disclosure generally relates to computer networks, and more specifically, to security for distributed applications.

BACKGROUND

A computer network is a collection of interconnected computing devices that exchange data and share resources. In a packet-based network, the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form.

Customer devices may connect to services provided by data centers. Data centers may host infrastructure equipment that provide customer devices with network services, such as hosting web services for enterprises and end users. Virtualized data centers are becoming a core foundation of the modern information technology (IT) infrastructure. In particular, modern data centers have extensively utilized virtualized environments in which virtual hosts, such as virtual machines or containers, are deployed and executed on an underlying compute platform of physical computing devices.

In a typical data center, clusters of storage systems and network devices are interconnected via a switch fabric provided by one or more tiers of physical network switches and routers. More sophisticated cloud data centers provide infrastructure spread throughout the world with subscriber support equipment located in various physical hosting facilities. In many examples of data centers, the infrastructure may include a combination of the physical devices, which may be referred to as the "underlay resources," that are linked to and communicate with a variety of virtual resources such as virtual servers, agents, and/or policy controllers, which may be referred to as "overlay resources."

The resources in data centers are vulnerable to increasing levels of cyber threats. Common types of network attacks include Denial of Service (DOS) attacks, spoofing attacks, packet eavesdropping or interception, and the like.

SUMMARY

In general, the disclosure describes techniques for providing dynamic threat treatment for a software defined networking (SDN) environment. For example, a controller (e.g., SDN controller) obtains information on one or more processes previously used to resolve a threat (referred to herein as, "threat treatment information"). The threat treatment information includes the steps (actions) that a user (current or another) previously performed to resolve (or attempt to resolve) the threat. The SDN controller generates one or more optimal treatment processes (e.g., series of actions) based on the obtained threat treatment information that may be used as a guide to resolve the same or similar threat.

As one example, the SDN controller generates a statistical model from the threat treatment information (referred to herein as, "threat treatment model"). For example, the obtained threat treatment information is evaluated with one or more machine-learning technologies to determine the probabilities of the actions and/or effects of those actions. Based on the threat treatment model, the controller may generate one or more optimal treatment processes that may be used as a guide for the current user to resolve the same or similar threat.

The techniques may provide one or more technical advantages. For example, by automatically generating one or more optimal treatment processes based on threat treatment information obtained from the SDN environment, the generated processes may be presented as a guide for a current user to resolve the same or similar threat, which may reduce the time and effort needed to resolve the threat. In addition, the controller may continue to obtain threat treatment information used to periodically refine the treatment processes, thereby improving the quality of the treatment processes over time.

In one example, a method includes determining that a security device of a network has detected a threat. The method also includes applying the threat to a threat treatment model, wherein the threat treatment model is generated based on threat treatment information that includes one or more steps used to resolve previous instances of the threat or previous instances of similar threats. The method further includes generating, based on the threat treatment model, one or more treatment processes to resolve the threat.

In another example, a software defined networking controller includes one or more processors, wherein the one or more processors are configured to: determine that a security device of a network has detected a threat; apply the threat to a threat treatment model, wherein the threat treatment model is generated based on threat treatment information that includes one or more steps used to resolve previous instances of the threat or previous instances of similar threats; and generate one or more treatment processes to resolve the threat based on the threat treatment model.

In another example, a method includes determining that a security device of the network has detected a threat. The method also includes determining that a prior instance of the threat or a similar threat does not exist. The method further includes tracking initial threat treatment information that includes one or more steps used to resolve the threat. The method further includes obtaining subsequent threat treatment information that includes one or more steps used to resolve subsequent instances of the threat or subsequent instances of similar threats. The method also includes generating a threat treatment model based on the initial threat treatment information and the subsequent threat treatment information. The method further includes generating, based on the threat treatment model, one or more treatment processes to resolve subsequent instances of the threat or subsequent instances of similar threats.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
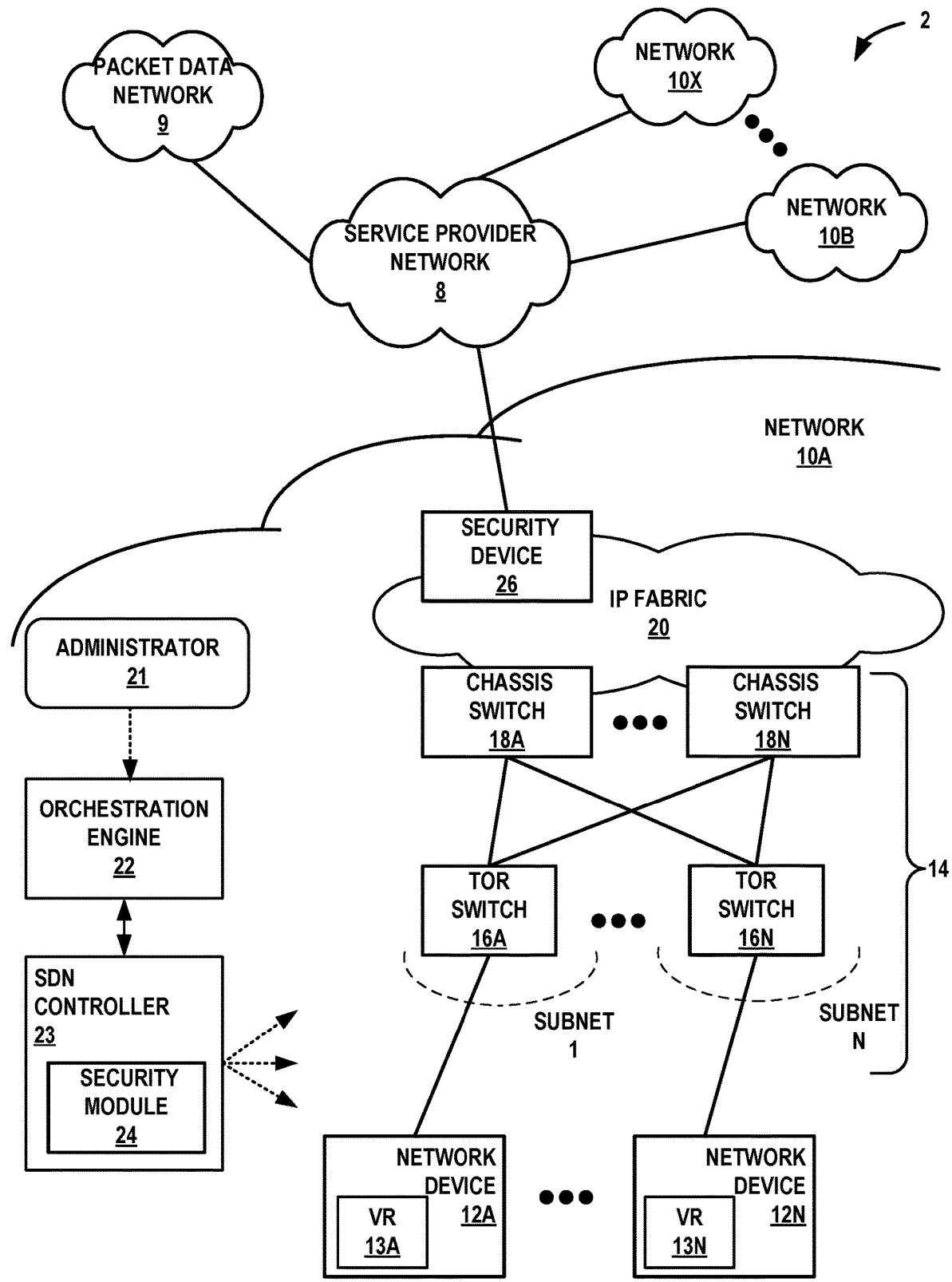
FIG. 1 is a block diagram illustrating an example network having a data center in which examples of the techniques described herein may be implemented.

FIG. 1 is a block diagram illustrating an example network system in which examples of the techniques described herein may be implemented. Network system 2 in the example of FIG. 1 includes networks 10A-10X (collectively, "networks 10") interconnected with one another and with packet data network 9 via a service provider network 8.

In the example of FIG. 1, network system 2 comprises a service provider network 8 that offers packet-based connectivity for networks 10 for accessing packet data network (PDN) 9, which may represent an external packet-based network such as the Internet. Service provider network 8 and PDN 12 provide packet-based services, such as bulk data delivery, voice over Internet protocol (VoIP), Internet Protocol television (IPTV), Short Messaging Service (SMS), Wireless Application Protocol (WAP) service, or customer-specific application services. PDN 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider, an enterprise IP network, or some combination thereof.

Each of networks 10 may be part of an enterprise network including a local area network (LAN) or wide area network (WAN). In some example implementations, each of networks 10 may be a data center that hosts infrastructure equipment, such as networking and storage systems, redundant power supplies, and environmental controls. In some examples, each of networks 10 may represent one of many geographically distributed network data centers. In some examples, each of networks 10 may be individual network servers, network peers, or otherwise. As illustrated in the example of FIG. 1, each of networks 10 may be a facility that provides network services. For example, a network data center may host web services for an enterprise. Other example services may include data storage, virtual private networks, traffic engineering, file service, data mining, scientific- or super-computing, and so on. Networks 10 may connect to service provider network 8 to enable physical or virtual devices within networks 10 to access networks external to the enterprise network, such as PDN 9.

In the example of FIG. 1, network 10A (and similarly with each of networks 10B-10X) may represent a data center that includes a set of storage systems and network devices 12A-12N (collectively, "network devices 12") interconnected via high-speed switch fabric 14 provided by one or more tiers of physical network switches and routers. Network devices 12 function as compute nodes of the data center. Network devices 12 may comprise application servers or user computers. In some examples, the terms "compute nodes" and "servers" are used interchangeably herein to refer to network devices 12. For example, each of network devices 12 may provide an operating environment for execution of one or more customer-specific virtual machines ("VMs"). Switch fabric 14 is provided by a set of interconnected top-of-rack (TOR) switches 16A-16N (collectively, "TOR switches 16") coupled to a distribution layer of chassis switches 18A-18N (collectively, "chassis switches 18"). Although not shown, network 10A may also include, for example, one or more non-edge switches, routers, hubs, gateways, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide network devices 12 with redundant (multi-homed) connectivity to IP fabric 20 and service provider network 8. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between networks 10 and PDN 9 via service provider network 8.

Network 10A may include a Software-Defined Network ("SDN") platform to control and manage network behavior. In some cases, an SDN platform includes a logically centralized and physically distributed SDN controller, e.g., SDN controller 23, and a distributed forwarding plane in the form of virtual routers, e.g., virtual routers 13A-13N (collectively, "VRs 13"), that extend the network from physical routers and switches in the switch fabric into a virtual overlay network hosted in virtualized servers. SDN controller 23 facilitates operation of one or more virtual networks within each of networks 10, such as network 10A, in accordance with one or more examples of this disclosure. Virtual networks are logical constructs implemented on top of the physical network within network 10A. In some examples, virtual networks may be implemented as a virtual private network (VPN), virtual LAN (VLAN), or the like. In some examples, SDN controller 23 may operate in response to configuration input received from orchestration engine 22, which in turn operates in response to configuration input received from network administrator 21. Additional information regarding SDN controller 23 operating in conjunction with other devices of network 10A or other software-defined network is found in International Application Number PCT/US2013/044378, filed Jun. 5, 2013, and entitled PHYSICAL PATH DETERMINATION FOR VIRTUAL NETWORK PACKET FLOWS, the entire contents of which is set forth herein.

In some examples, orchestration engine 22 manages application-layer functions of network 10 such as managing compute, storage, networking, and application resources executing on network devices 12. For example, orchestration engine 22 may attach virtual machines (VMs) to a tenant's virtual network and generally manage the launching, migration and deconstruction of the VMs as needed. Each virtual machine may be referred to as a virtualized application workload (or just application workload) and generally represents a virtualized execution element, such as a VM or a container. Orchestration engine 22 may connect a tenant's virtual network to some external network, e.g. the Internet or a VPN. Orchestration engine 22 may deploy a network service (e.g. a load balancer) in a tenant's virtual network.

In some examples, SDN controller 23 is a lower-level controller tasked with managing the network and networking services of network 10A and, in particular, switch fabric 14 that provides connectivity between network devices 12. SDN controller 23 utilizes a set of communication protocols to configure and control routing and switching elements of switch fabric 14 to create an overlay network, which generally refers to a set of tunnels for transporting packets to and from network devices 12 within network 10A.

One such communication protocol to configure the network (e.g., switch fabric 14, IP fabric 20, etc.) may include a messaging protocol such as Extensible Messaging and Presence Protocol (XMPP), for example. For example, SDN controller 23 implements high-level requests from orchestration engine 22 by configuring physical devices of networks 10 (e.g. TOR switches 16, chassis switches 18, and switch fabric 14; physical routers; physical service nodes such as firewalls and load balancers; and virtual services such as virtual firewalls in a VM). SDN controller 23 maintains routing, networking, and configuration information within a state database. SDN controller 23 communicates a suitable subset of the routing information and configuration information from the state database to virtual router (VR) agents (not shown) on each of VRs 13 of network devices 12.

In the example of FIG. 1, network 10A may include security device 26 that includes a firewall, intrusion detection, and/or intrusion prevention device. Security device 26 performs packet forwarding and packet filtering services for network 10A. For example, security device 26 applies one or more firewall policies to network traffic flowing between one or more applications executing on virtual machines of network devices 12 and other devices external to network 10A, such as those connected to network 10A via service provider network 8. Security device 26 may implement sophisticated security rules to permit or block network traffic external to network 10A before the network traffic enters a private cloud (e.g., for an IT department) provided by network 10A or a hybrid cloud (e.g., a cloud which leverages a combination of public clouds and private clouds) provided by network 10A.

In some examples, security device 26 enforces each firewall policy at a port and protocol level. In other examples, security device 26 enforces each firewall policy at an OSI Layer 7 application level (e.g., Hyper Text Transfer Protocol (HTTP) traffic may be permitted while Secure Socket Layer (SSL) traffic is blocked). Each firewall policy defines a plurality of network traffic rules based on information related to the threat. The information to generate a policy may include the type of threat, source and destination endpoints affected by the threat, threat severity, etc.

In some examples, security device 26 may block traffic based on 5-tuple rules (e.g., a Layer 3 or Layer 4 firewall), based on an Access Control List (ACL), or based on 5-tuples and an application identifier (ID) or signature (e.g., a Layer 7 firewall). Each network traffic rule may include at least one source IP address, at least one source port, at least one destination IP address, at least one destination port, a protocol, may specify whether or not the network traffic rule is application-based, and may further specify pattern matching rules (e.g., regular expressions). In some examples, the network traffic rule may further specify a corresponding permission action for network traffic originating from the source and destined for the destination (e.g., block the traffic, allow the traffic, log the traffic, or report the traffic to an administrator).

In some examples, the source and destination of the network traffic are represented by one or more network addresses and/or one or more subnets. For example, based on the firewall policies, security device 26 may block or permit the network traffic flowing to or from the one or more applications. For example, based on a first firewall policy, security device 26 may block network traffic originating from one or more addresses specified by the first firewall policy and destined for the one or more applications. As another example, based on a second firewall policy, security device 26 may allow network traffic originating from one or more addresses specified by the second firewall policy and destined for the one or more applications. As a further example, based on a third firewall policy, security device 26 may block network traffic originating from the one or more applications and destined for one or more addresses specified by the third firewall policy. As yet a further example, based on a fourth firewall policy, security device 26 may allow network traffic originating from the one or more applications and destined for one or more addresses specified by the fourth firewall policy.

In some examples, security device 26 is a physical firewall component and comprises hardware or a combination of hardware and software. In other examples, security device 26 is a virtual firewall component and comprises software executing on one or more virtual machines, and in some cases the virtual machine(s) may reside on a device outside the cloud, and between SDN controller 23 and upstream routers of an external network. In some examples, security device 26 is part of the infrastructure of network 10A, or in other examples, security device 26 is operated by a third party on a network separate from network 10A.

In some instances, data and technology stored in networks 10 may be subject to a network attack, such as Denial of Service (DOS) attacks, spoofing attacks, packet eavesdropping or interception, and the like. Users, e.g., administrators, are tasked to protect computer networks. Administrators may use SDN controller 23 to perform application-aware firewall policy enforcement for network 10A. SDN controller 23 may apply network permissions or firewall policies to control packet forwarding and packet filtering for network 10A. For example, SDN controller 23 may determine firewall policies for an application and configure security device 26 with the firewall policies. Security device 26 may apply the firewall policies to network traffic for the application.

In some example implementations, security device 26 may send a potential threat to a threat analysis system, e.g., anti-malware system (not shown). The threat analysis system may in some examples be included in security device 26 or may be external to security device 26, e.g., as a cloud-based system. The threat analysis system may determine whether the potential threat is in fact a threat, and if so, the threat analysis system notifies security device 26 to block the threat. In some instances, the threat analysis system may also notify SDN controller 23 such that SDN controller 23 may create or modify a policy and/or one or more rules of the policy to be enforced.

In some example implementations, networks 10 provide infrastructure located in different geographic locations. In these examples, a respective administrator may be tasked to protect a computer network (e.g., one of networks 10) of a corresponding geographical region. When a computer network of a particular geographical region is exposed to a threat, the administrator of the particular geographical region may typically analyze the threat, determine the possible solutions (e.g., steps to be followed to resolve the threat), and generate or modify policies based on information related to the threat to resolve the threat. Other administrators may also face the same or similar threat affecting their respective computer networks.

In accordance with the techniques described herein, security module 24 of SDN controller 23 may obtain threat treatment information from one or more users that previously performed one or more steps to resolve prior instances of a threat, apply a detected threat to a threat treatment model that is generated based on the threat treatment information, and generate one or more optimal treatment processes to resolve the threat or similar threat based on the threat treatment model.

For example, SDN controller 23 may periodically obtain threat treatment information such as the different steps that one or more users have previously performed when resolving the same or similar threats, including user interactions with software, screens visited, time spent on a screen, actions taken after visiting a screen, following steps taken, and other user behavior for resolving the threats. For example, security module 24 may instruct SDN controller 23 to track user click events or other user interactions with network services and software. Users may include the current user of a network (e.g., administrator 21 of network 10A) and another local user of network 10A.

SDN controller 23 may also obtain information such as threat type (otherwise referred to as "feed type"), endpoint type, rule type, geographical location, past history availability with current user, past history with other users, number of actions taken by other users to resolve. Threat type may include the type of threat, such as a threat to a centralized computer (e.g., command and control (C&C) server threat), a location based threat (e.g., Geo-IP threat), or threat that infects a host. Endpoint type may include the type of endpoint (e.g., virtual/physical router, virtual/physical switch, etc.). Rule type may include the type of rule that is used for a policy to resolve the threat. Geographical location may include information on the geographical location of network infrastructure. Past history availability with current user may include data of a process in which the user has resolved a prior instance of the threat. Past history with other users may include data of a process in which other users (e.g., users of networks 10B-10X) have resolved a prior instance of the threat. Number of actions taken by other users (e.g., users/administrators of network 10B-10X) to resolve may include the number of steps taken by other users to resolve a prior instance of the threat.

Security module 24 may instruct SDN controller 23 to obtain threat treatment information from network components, such as network topology, network device configuration, or the like. Moreover, security module 24 may instruct SDN controller 23 to obtain threat treatment information from network services, such as telemetry information and information on network management software. SDN controller 23 may communicate with other SDN controllers that manage and control network infrastructure of remote networks (e.g., networks 10B-10X) to collect threat treatment information from other users that have resolved or attempted to resolve the same or similar threats. As one example, SDN controller 23 may obtain the threat treatment information from other users via a border gateway protocol (BGP) session with other SDN controllers. In some examples in which there is no information on a previous process (i.e., the threat has not been previously resolved), SDN controller 23 may track the steps performed by the current user to resolve a current threat.

Security module 24 may apply one or more machine-learning techniques to the above threat treatment information to generate one or more treatment processes. As one example, security module 24 may apply one or more machine-learning techniques to generate a threat treatment model based on the collected threat treatment information. For example, security module 24 may generate the threat treatment model based on machine-learning techniques such as Hidden Markov Model (HMM), reinforcement learning, temporal learning, Viterbi algorithm, Bayesian Networks, Dynamic programming, Markov Decision Process (MDP), or the like. As further described in FIG. 5, the threat treatment model may define the actions performed by other users, effects of those actions, the probability of performing a subsequent action based on the performance of a current action (referred to herein as "next action probability"), and the probability of having an effect as a result of performing a particular action (referred to herein as "action effect probability").

The actions may be, for example, user interactions with the network services or software. As one example, a user may perform four actions to resolve a threat. In this example, security module 24 may generate a threat treatment model that includes a first action of downloading a manifest file, a second action of performing a backup of files, a third action of blocking a network address of a network device, and a fourth action of cleaning the system.

The effects may indicate the outcome that results from the performance of one or more actions. For example, when a user downloads a manifest file (first action) and/or blocks a network address (third action), the effects may indicate whether the result of the first and/or third actions, independently or in combination, makes the system safer, less safe, or no change. As another example, when a user downloads the manifest file (first action), the effect may indicate whether the first action provides useful information or whether the first action is of little or no value.

A next action probability may be, for example, the probability of performing a subsequent action in response to the performance of a current action. As one example, the next action probability may indicate that there is a 10% probability of blocking a network address (subsequent action) for traffic received from an IP address of 10.192.02.12 (current action). The next action probability may also indicate that there is a 90% probability of allowing the network address (subsequent action) for traffic received from the IP address of 10.192.02.12 (current action).

An action effect probability may be, for example, the probability of having a respective effect when performing a corresponding action. For example, the action effect probability may indicate an 85% probability of resolving a threat (effect) after downloading a manifest file and updating configuration for a network device based on the configuration suggested by the manifest file (action).

In response to determining that security device 26 has detected a threat, security module 24 may generate one or more optimal treatment processes to resolve the detected threat based on the threat treatment information. For example, security module 24 may apply a dynamic programming algorithm (e.g., Viterbi algorithm) to the threat treatment model to generate one or more optimal treatment processes to be used as a guide to resolve the threat. A dynamic programming algorithm may be applied to a data model to generate optimal solutions. As one example, security module 24 may apply a Viterbi algorithm to determine the most optimal sequence of observed events (e.g., actions and effects) based on the probabilities of the actions and effects. The optimization may also be based on factors such as effectiveness of treatment, least time-consuming (e.g., the least number of steps), and other factors.

In some examples, security module 24 may generate a graph including a Viterbi path that represents a respective solution to resolve the detected threat. As further described in FIG. 6, the start of the graph may represent a particular user and each vertices of the graph may represent the actions in the threat treatment model. The graph may indicate one or more paths from a source point to a destination point among one or more levels. Security module 24 may apply the Viterbi algorithm to the graph to generate an optimal path from the one or more paths. In some examples, security module 24 may present the graph, via a user interface, for which a user may perform the steps of the graph in accordance with the Viterbi path along ordered actions and may stop at any point along the path when the effect of the action is satisfactory for the user. In some examples, SDN controller 23 may automatically generate one or more policies (or one or more rules within a policy) based on the one or more actions of the optimal path and may send the one or more generated policies to virtual routers (e.g., endpoints) or security device 26 (e.g., firewall) to resolve the threat.

In some example implementations, security module 24 may receive user feedback for the one or more treatment processes. As one example, the user feedback may include the level of satisfaction for a particular path in the treatment processes. In other examples, the user feedback may be more granular, such as whether a specific action in the treatment process is satisfactory. Using the feedback, security module 24 may modify the threat treatment model.

In some example implementations, security module 24 may modify the treatment processes based on the results of the threat treatment. As one example, a particular solution (e.g., path) may require performing the solution multiple times to resolve the threat. In this case, security module 24 may modify the process for the unsatisfactory treatment. For example, security module 24 may modify the threat treatment model, such as regenerating the threat treatment model based on modified one or more probabilities associated with one or more actions of the action sequence. In some examples, security module 24 may modify the probability of the threat treatment model based on the Markov decision process (MDP).

In this way, the techniques may provide one or more technical advantages. For example, by providing an SDN controller that automatically generates optimal treatment processes based on threat treatment information obtained from the SDN environment, users may use the treatment processes as a guide to effectively and efficiently resolve the same or similar threats. In addition, the SDN controller may refine the one or more treatment processes by continually obtaining threat treatment information, thereby improving the quality and performance of the treatment processes.

Figure 2:
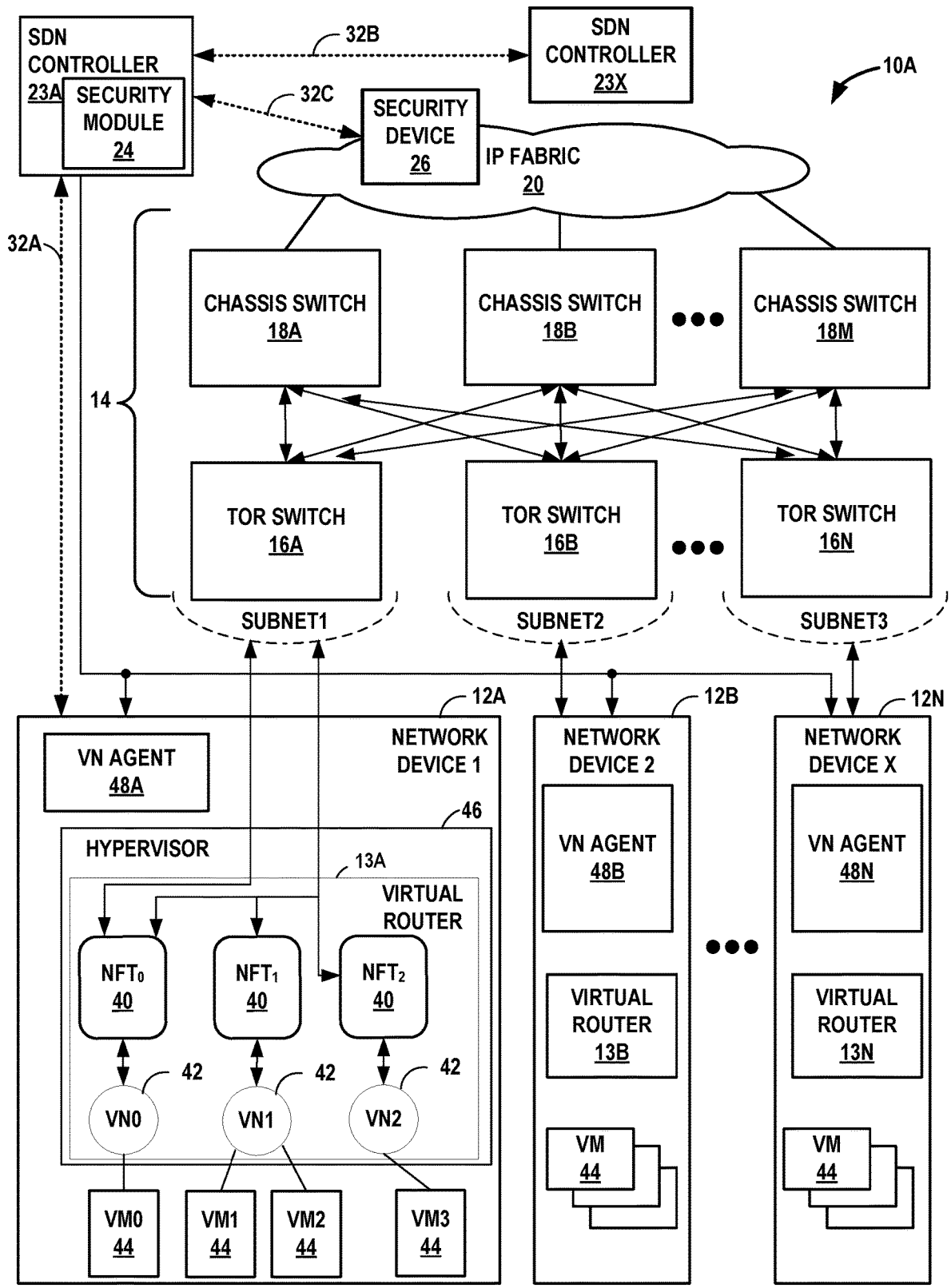
FIG. 2 is a block diagram illustrating an example implementation of network 10A of FIG. 1 in further detail, in accordance with the techniques described herein.

FIG. 2 is a block diagram illustrating an example implementation of network 10A of FIG. 1 in further detail, in accordance with the techniques described herein. In the example of FIG. 2, network 10A includes interconnections that extend switch fabric 14 from physical switches 16, 18 to software or "virtual" routers 13A-13N (collectively, "virtual routers 13"). Virtual routers 13 dynamically create and manage one or more virtual networks 42 usable for communication between application instances. In one example, virtual routers 13 execute the virtual network as an overlay network, which provides the capability to decouple an application's virtual address from a physical address (e.g., IP address) of the one of network devices 12A-12N ("network devices 12") on which the application is executing. Each virtual network may use its own addressing and security scheme and may be viewed as orthogonal from the physical network and its addressing scheme. Various techniques may be used to transport packets within and across virtual networks 42 over the physical network.

Each virtual router 13 may execute within a hypervisor, a host operating system or other component of each of network devices 12. Each of network devices 12 may represent an x86 or other general-purpose or special-purpose computer or server capable of executing virtual machines 44. In the example of FIG. 2, virtual router 13A executes within hypervisor 46, also often referred to as a virtual machine manager (VMM), which provides a virtualization platform that allows multiple operating systems to concurrently run on one of network devices 12. In the example of FIG. 2, virtual router 13A manages virtual networks 42, each of which provides a network environment for execution of one or more virtual machines (VMs) 44 on top of the virtualization platform provided by hypervisor 46. Each VM 44 is associated with one of the virtual networks VN0-VN2 and may represent tenant VMs running customer applications such as Web servers, database servers, enterprise applications, or hosting virtualized services used to create service chains. In some cases, any one or more of network devices 12 or another computing device may host customer applications directly, i.e., not as virtual machines. In some cases, some of VMs 44 may represent containers, another form of virtualized execution environment. That is, both virtual machines and containers are examples of virtualized execution environments for executing application workloads.

In general, each VM 44 may be any type of software application and may be assigned a virtual address for use within a corresponding virtual network 42, where each of the virtual networks may be a different virtual subnet provided by virtual router 13A. A VM 44 may be assigned its own virtual layer three (L3) IP address, for example, for sending and receiving communications but may be unaware of an IP address of the physical network device 12A on which the virtual machine is executing. In this way, a "virtual address" is an address for an application that differs from the logical address for the underlying, physical computer system, e.g., network device 12A.

In one implementation, each of network devices 12 includes a corresponding one of virtual network (VN) agents 48A-48N (collectively, "VN agents 48") that controls virtual networks 42 and that coordinates the routing of data packets within network devices 12. In general, each VN agent 48 communicates with virtual SDN controller 23, which generates commands to control routing of packets through network 10A. VN agents 48 may operate as a proxy for control plane messages between virtual machines 44 and SDN controller 23. For example, a VM 44 may request to send a message using its virtual address via the VN agent 48A, and VN agent 48A may in turn send the message and request that a response to the message be received for the virtual address of the VM 44 that originated the first message. In some cases, a VM 44 may invoke a procedure or function call presented by an application programming interface of VN agent 48A, and the VN agent 48A may handle encapsulation of the message as well, including addressing.

In one example, network packets, e.g., layer three (L3) IP packets or layer two (L2) Ethernet packets generated or consumed by the instances of applications executed by virtual machines 44 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet."

Encapsulation and/or de-capsulation of virtual network packets within physical network packets may be performed within virtual routers 13, e.g., within the hypervisor or the host operating system running on each of network devices 12. This functionality is referred to herein as tunneling and may be used within network 10A to create one or more tunnels for communication between network devices 12. For example, virtual routers 13 may use MPLS over UDP/GRE.

Each of SDN controllers 23A-23X (collectively, "SDN controllers 23") may represent the logically centralized and physically distributed SDN controller 23 of FIG. 1. For example, SDN controller 23A facilitates operation of one or more virtual networks within network 10A, and SDN controller 23X facilitates operation of one or more virtual networks within a remote network (e.g., any of networks 10B-10X of FIG. 1). Each of SDN controllers 23 may, for example, maintain a routing information base, e.g., one or more routing tables that store routing information for the physical network as well as one or more networks of network 10A. Similarly, switches 16, 18 and virtual routers 13 maintain routing information, such as one or more routing and/or forwarding tables. In one example implementation, virtual router 13A of hypervisor 46 implements a network forwarding table (NFT) 40 for each virtual network 42. In general, each NFT 40 stores forwarding information for the corresponding virtual network 42 and identifies where data packets are to be forwarded and whether the packets are to be encapsulated in a tunneling protocol, such as with a tunnel header that may include one or more headers for different layers of the virtual network protocol stack.

In accordance with the techniques described herein, SDN controller 23A may include security module 24 that obtains threat treatment information from the SDN environment, apply a detected threat to a threat treatment model that is generated based on the threat treatment information, and generate one or more optimal treatment processes based on the threat treatment model.

Each of SDN controllers 23 may monitor resources, such as physical compute nodes as well as any virtualized hosts that are managed and controlled by the SDN controller. For example, SDN controller 23A may collect information from resources such as network devices 12A-12X. Such information may include the network infrastructure information, geographical location of the resources affected by a threat, the endpoint type, and/or other information about the virtualized networks managed and operated by SDN controller 23. As one example, SDN controller 23A may use XMPP session 32A to communicate with network devices 12 to obtain information about virtualized entities, e.g., VMs 44.

SDN controller 23A may also collect threat treatment information of a current user such as user interactions with software, including screens visited, time spend on a screen, actions taken after visiting a screen, following steps taken, and other user behavior for resolving a threat.

Similarly, SDN controller 23A may obtain threat treatment information from SDN controller 23X, including steps performed by another user and/or information about remote network resources. For example, SDN controller 23A may use BGP session 32B with SDN controller 23X to obtain threat treatment information collected by SDN controller 23X.

SDN controller 23A may use a network management protocol, such as Network Configuration Protocol (NETCONF) session 32C to learn of the rule type and/or threat type from security device 26. In some examples, SDN controller 23 may use other communication sessions to obtain information from other network devices not shown in FIG. 2.

As described above, security module 24 may generate one or more optimal treatment processes based on the obtained threat treatment information. As one example, security module 24 may generate the one or more optimal treatment processes based on a threat treatment model generated from the obtained threat treatment information. In some examples, the optimal treatment processes may be generated as a threat treatment graph (as further described in FIG. 6) for which a user may use the threat treatment graph illustrating one or more optimal treatment processes as a guide to resolve a threat. Alternatively, or additionally, SDN controller 23 may automatically configure a firewall policy based on the generated treatment processes and send a message with a firewall policy via NETCONF session 32C to provision security device 26 with the firewall policy and/or push the policy to the VN agent of the impacted user device/server (e.g., VN agent 48A of network device 12A) or to a firewall (e.g., security device 26).

Figure 3:
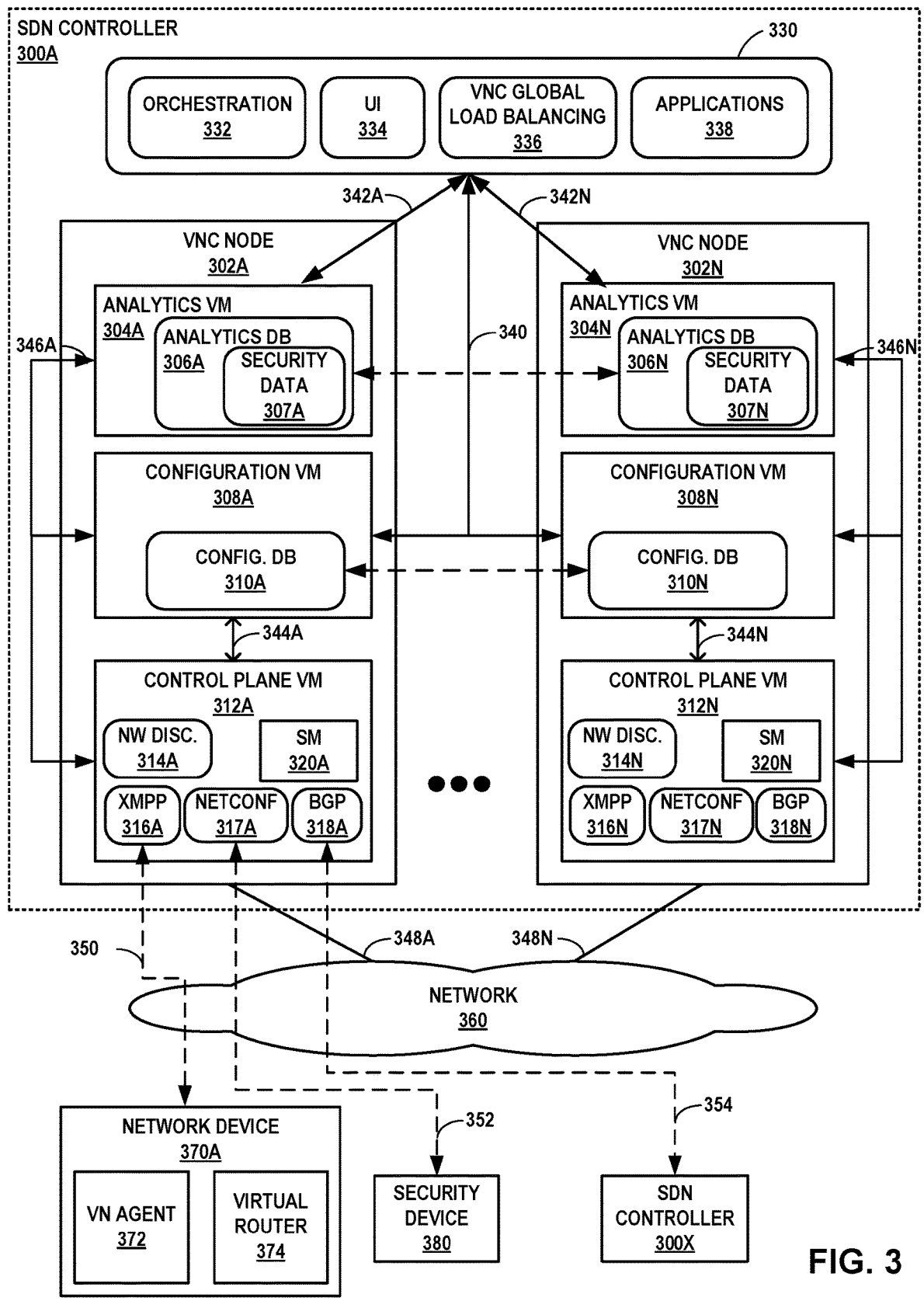
FIG. 3 is a block diagram illustrating a computing device that executes an example SDN controller, in accordance with the techniques described herein.

FIG. 3 is a block diagram illustrating a computing device that executes an example SDN controller, in accordance with the techniques described herein. SDN controller 300A may, for example, correspond to SDN controller 23 of FIGS. 1-2.

SDN controller 300A of FIG. 3 illustrates a distributed implementation of a virtual network controller (VNC) that includes multiple VNC nodes 302A-302N (collectively, "VNC nodes 302") to execute the functionality of SDN controller 300, including managing the operation of virtual routers for one or more virtual networks implemented within the data center. Each of VNC nodes 302 may represent a different network devices of the data center, e.g., any of network devices 12 of FIGS. 1-2, or alternatively, a network device or controller coupled to the IP fabric by, e.g., an edge router of a service provider network or a customer edge device of the data center network. In some instances, some of VNC nodes 302 may execute as separate virtual machines on the same network device.

Each of VNC nodes 302 may control a different, non-overlapping set of data center elements, such as network devices, individual virtual routers executing within network devices, individual interfaces associated with virtual routers, chassis switches, TOR switches, and/or communication links. VNC nodes 302 peer with one another according to a peering protocol operating over network 360. Network 360 may represent an example instance of switch fabric 14 and/or IP fabric 20 of FIG. 1. In the illustrated example, VNC nodes 302 peer with one another using a Border Gateway Protocol (BGP) implementation, an example of a peering protocol. In this sense, VNC nodes 302A and 302N may represent a first controller node device and a second controller node device, respectively, peered using a peering protocol. VNC nodes 302 include respective network discovery modules 314A-314N to discover network elements of network 360.

VNC nodes 302 provide, to one another using the peering protocol, information related to respective elements of the virtual network managed, at least in part, by the VNC nodes 302. For example, VNC node 302A may manage a first set of one or more network devices operating as virtual routers for the virtual network. VNC node 302A may send information relating to the management or operation of the first set of network devices to VNC node 302N by BGP 318A. Other elements managed by VNC nodes 302 may include network controllers and/or appliances, network infrastructure devices (e.g., L2 or L3 switches), communication links, firewalls, and VNC nodes 302, for example. Because VNC nodes 302 have a peer relationship, rather than a master-slave relationship, information may be sufficiently easily shared the VNC nodes 302. In addition, hardware and/or software of VNC nodes 302 may be sufficiently easily replaced, providing satisfactory resource fungibility.

Each of VNC nodes 302 may include substantially similar components for performing substantially similar functionality, said functionality being described hereinafter primarily with respect to VNC node 302A. VNC node 302A may include an analytics database 306A for storing diagnostic information related to a first set of elements managed by VNC node 302A. VNC node 302A may share at least some diagnostic information related to one or more of the first set of elements managed by VNC node 302A and stored in analytics database 306, as well as to receive at least some diagnostic information related to any of the elements managed by others of VNC nodes 302. Analytics database 306A may represent a distributed hash table (DHT), for instance, or any suitable data structure for storing diagnostic information for network elements in a distributed manner in cooperation with others of VNC nodes 302.

VNC node 302A may include a configuration database 310A for storing configuration information related to a first set of elements managed by VNC node 302A. Control plane components of VNC node 302A may store configuration information to configuration database 310A using interface 344A, which may represent an Interface for Metadata Access Points (IF-MAP) protocol implementation. VNC node 302A may share at least some configuration information related to one or more of the first set of elements managed by VNC node 302A and stored in configuration database 310A, as well as to receive at least some configuration information related to any of the elements managed by others of VNC nodes 302. Configuration database 310A may represent a distributed hash table (DHT), for instance, or any suitable data structure for storing configuration information for network elements in a distributed manner in cooperation with others of VNC nodes 302.

SDN controller 300A may perform any one or more of the illustrated virtual network controller operations represented by modules 330, which may include orchestration 332, user interface 334, VNC global load balancing 336, and one or more applications 338. SDN controller 300A executes orchestration module 332 to facilitate the operation of one or more virtual networks in response to a dynamic demand environment by, e.g., spawning/removing virtual machines in data center network devices, adjusting computing capabilities, allocating network storage resources, and modifying a virtual topology connecting virtual routers of a virtual network. VNC global load balancing 336 executed by SDN controller 300A supports load balancing of analytics, configuration, communication tasks, e.g., among VNC nodes 502. Applications 338 may represent one or more network applications executed by VNC nodes 302 to, e.g., change topology of physical and/or virtual networks, add services, or affect packet forwarding.

User interface 334 includes an interface usable by an administrator (or software agent) to control the operation of VNC nodes 302. For instance, user interface 334 may include methods by which an administrator may modify, e.g. configuration database 310A of VNC node 302A. Administration of the one or more virtual networks operated by SDN controller 300A may proceed by uniform user interface 334 that provides a single point of administration, which may reduce an administration cost of the one or more virtual networks.

VNC node 302A may include a control plane virtual machine (VM) 312A that executes control plane protocols to facilitate the distributed VNC techniques. Control plane VM 312A may in some instances represent a native process. Control VM 312A executes BGP 318A to provide information related to the first set of elements managed by VNC node 302A to, e.g., control plane virtual machine 312N of VNC node 302N. Control plane VM 512A may use an open standards based protocol (e.g., BGP based L3VPN) to distribute information about its virtual network(s) with other control plane instances and/or other third party networking equipment(s). Given the peering based model according to one or more aspects described herein, different control plane instances (e.g., different instances of control plane VMs 312A-312N) may execute different software versions. In one or more aspects, e.g., control plane VM 312A may include a type of software of a particular version, and the control plane VM 312N may include a different version of the same type of software. The peering configuration of the control node devices may enable use of different software versions for the control plane VMs 312A-312N. The execution of multiple control plane VMs by respective VNC nodes 502 may prevent the emergence of a single point of failure.

Control plane VM 312A communicates with virtual routers, e.g., illustrated virtual router 374 executed by network device 370, using a communication protocol operating over network 360. Virtual routers facilitate overlay networks in the one or more virtual networks. In the illustrated example, control plane VM 312A uses Extensible Messaging and Presence Protocol (XMPP) 316A to communicate with at least virtual router 374 by XMPP interface 350. Virtual router data, statistics collection, logs, and configuration information may in accordance with XMPP 316A be sent as XML documents for communication between control plane VM 312A and the virtual routers. Control plane VM 312A may in turn route data to other XMPP servers (such as an analytics collector) or may retrieve configuration information on behalf of one or more virtual routers. Control plane VM 312A may further execute a communication interface 344A for communicating with configuration virtual machine (VM) 308A associated with configuration database 310A. Communication interface 344A may represent an IF-MAP interface.

VNC node 302A may further include configuration VM 308A to store configuration information for the first set of elements in configuration database 310A. Configuration VM 308A, although described as a virtual machine, may in some aspects represent a native process executing on an operating system of VNC node 302A. Configuration VM 308A and control plane VM 312A may communicate using IF-MAP by communication interface 344A and using XMPP by communication interface 346A. In some aspects, configuration VM 308A may include a horizontally scalable multi-tenant IF-MAP server and a distributed hash table (DHT)-based IF-MAP database that represents configuration database 310A. In some aspects, configuration VM 308A may include a configuration translator, which may translate a user friendly higher-level virtual network configuration to a standards based protocol configuration (e.g., a BGP L3VPN configuration), which may be stored using configuration database 310A.

Communication interface 340 may include an IF-MAP interface for communicating with other network elements. The use of the IF-MAP may make the storage and management of virtual network configurations very flexible and extensible given that the IF-MAP schema can be dynamically updated. Advantageously, aspects of SDN controller 300A may be flexible for new applications 338.

VNC node 302A may further include an analytics virtual machine (VM) 304A to store diagnostic information (and/or visibility information) related to at least the first set of elements managed by VNC node 302A. Control plane VM and analytics VM 304 may communicate using an XMPP implementation by communication interface 346A. Analytics VM 304A, although described as a virtual machine, may in some aspects represent a native process executing on an operating system of VNC node 302A.

Analytics VM 304A may include analytics database 306A, which may represent an instance of a distributed database that stores visibility data for virtual networks. Visibility information may describe visibility of both distributed SDN controller 300A itself and of customer networks. The distributed database may include an XMPP interface on a first side and a REST/JSON/XMPP interface on a second side.

Virtual router 374 may implement the layer 3 forwarding and policy enforcement point for one or more end points and/or one or more hosts. The one or more end points and/or one or more hosts may be classified into a virtual network due to configuration from control plane VM 312A. Control plane VM 312A may also distribute virtual-to-physical mapping for each end point to all other end points as routes. These routes may give the next hop mapping virtual IP to physical IP and encapsulation technique used (e.g., one of IPinIP, NVGRE, VXLAN, etc.). Virtual router 374 may be agnostic to actual tunneling encapsulation used. Virtual router 574 may also trap interesting layer 2 (L2) packets, broadcast packets, and/or implement proxy for the packets, e.g. using one of Address Resolution Protocol (ARP), Dynamic Host Configuration Protocol (DHCP), Domain Name Service (DNS), etc.

In some cases, different VNC nodes 302 may be provided by different suppliers. However, the peering configuration of VNC nodes 302 may enable use of different hardware and/or software provided by different suppliers for implementing the VNC nodes 302 of distributed SDN controller 300A. A system operating according to the techniques described above may provide logical view of network topology to end-host irrespective of physical network topology, access type, and/or location. Distributed SDN controller 300A provides programmatic ways for network operators and/or applications to change topology, to affect packet forwarding, and/or to add services, as well as horizontal scaling of network services, e.g. firewall, without changing the end-host view of the network.

Control plane VMs 312 may request the network devices 12 return a physical path through a virtual network for a network flow. Upon control plane VMs 312 receiving a physical path, corresponding analytics VMs 304 may store the physical path to corresponding analytics databases 306. In some instances, any of VNC nodes 302 may determine a physical path through virtual network for a network flow using techniques described herein as being performed by a network device 12.

In accordance with various aspects of the techniques described in this disclosure, security modules 320A-320N (collectively, "SMs 320") may obtain threat treatment information, apply a detected threat to a threat treatment model that is generated based on the threat treatment information, and generate one or more optimal treatment processes based on the threat treatment model. In the example of FIG. 3, service modules 320 may represent service module 24 of FIGS. 1-2.

To obtain threat treatment information, service module 320A may collect information of a current user (or other local user) such as user interactions with UI 334, information from network components (e.g., network device 370A), and/or information from others users via SDN controller 300X. For example, service module 320A may instruct control plane VM 312A to use XMPP 316A to communicate with network device 370A to obtain information from network device 370A. In some examples, service module 320A may also instruct control plane VM 312A to use NETCONF 317A to communicate with security device 380 by NETCONF interface 352 to obtain information, such as threat information or rule/policy information. In some examples, service module 320A may instruct control plane VM 312A to use BGP 318A to communicate with SDN controller 300X by BGP interface 354 to obtain threat treatment information of other users that have previously performed steps to resolve the same or similar threat.

Security module 320A may instruct SDN controller 300A to store the collected threat treatment information in security data 307A. Although illustrated as being included in analytics database 306A, security data 307A may be stored in any database of SDN controller 300A.

Security module 320A may retrieve the threat treatment information stored in security data 307A to generate one or more optimal threat treatment processes. For example, security module 320A may use the threat treatment information stored in security data 307A to generate a threat treatment model, as further described in FIG. 5.

Figure 4:
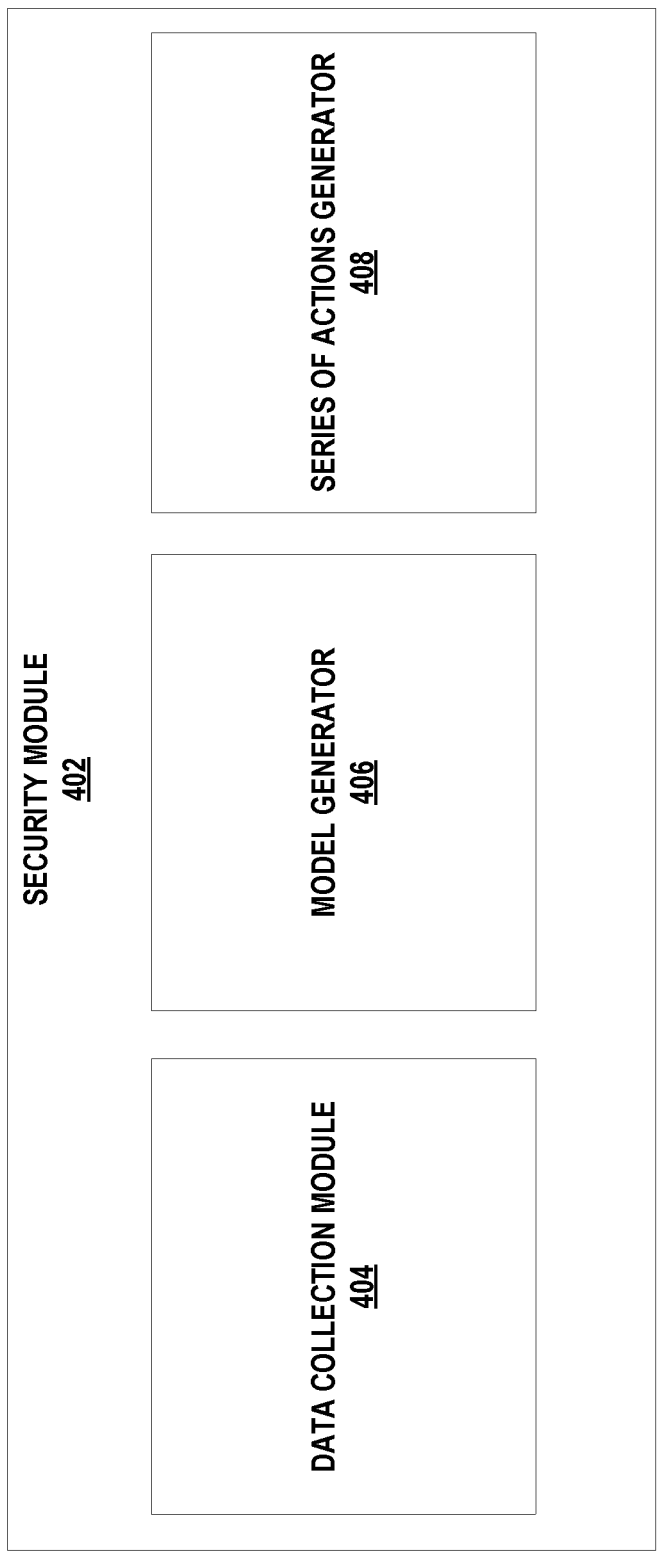
FIG. 4 is a block diagram illustrating an example security module executed within an SDN controller, in accordance with the techniques described herein.

FIG. 4 is a block diagram illustrating an example security module in further detail, in accordance with the techniques described herein. Security module 402 may operate substantially similar to any of SMs 320 within SDN controller 300A of FIG. 3 or security module 24 within SDN controller 23 of FIGS. 1 and 2. In the example of FIG. 4, security module 402 may include a data collection module 404, model generator 406, a treatment process generator 408.

Data collection module 404 may instruct a control node (e.g., control plane virtual machines 312 of FIG. 3) to implement one or more protocols to obtain threat treatment information. For example, data collection module 404 may instruct the control node to implement a BGP communication session to obtain threat treatment information from a remote SDN controller. In some examples, data collection module 404 may instruct the control node to implement NETCONF to obtain firewall policies and/or rules of the policies. In some examples, data collection module 404 may instruct the control node to implement XMPP to obtain information from network resources. Data collection module 404 may also collect information of a local user such as user interactions with software, including screens visited, time spend on a screen, actions taken after visiting a screen, following steps taken, and other user behavior for resolving a threat.

Model generator 406 may generate one or more threat treatment models. For example, model generator 406 may retrieve threat treatment information from an analytics database (e.g., analytics databases 306 of FIG. 3) to generate a threat treatment model. In some example implementations, model generator 406 may generate the threat treatment model based on one or more machine-learning techniques such as Hidden Markov Model (HMM), reinforcement learning, temporal learning, Viterbi algorithm, Bayesian Networks, Dynamic programming, Markov Decision Process (MDP), or the like. As one example, model generator 406 may generate a threat treatment model based on HMM that includes a plurality of actions, one or more effects of the plurality of actions, one or more probabilities of a first action being performed in response to the performance of a second action, and one or more probabilities of an effect occurring in response to the performance of an action. In some examples, model generator 406 may generate a threat treatment model diagram and display the threat treatment model diagram via a user interface (e.g., user interface 334 of FIG. 3). For example, model generator 406 may generate the associations between the actions, effects, next action probabilities, and/or the action effect probabilities.

Treatment process generator 408 may generate one or more treatment processes to be used to resolve a threat. For example, treatment process generator 408 may apply, to the threat treatment model generated by model generator 406, a dynamic programming algorithm to generate a series of actions that may be used to resolve a threat. For example, treatment process generator 408 may apply a Viterbi algorithm to the threat treatment model to generate an optimal path among the one or more paths that represents an optimized treatment process to resolve the threat. In some examples, treatment process generator 408 may generate a graph (referred to herein as threat treatment graph) of ordered actions and display the threat treatment graph via a user interface (e.g., user interface 334 of FIG. 3).

Figure 5:
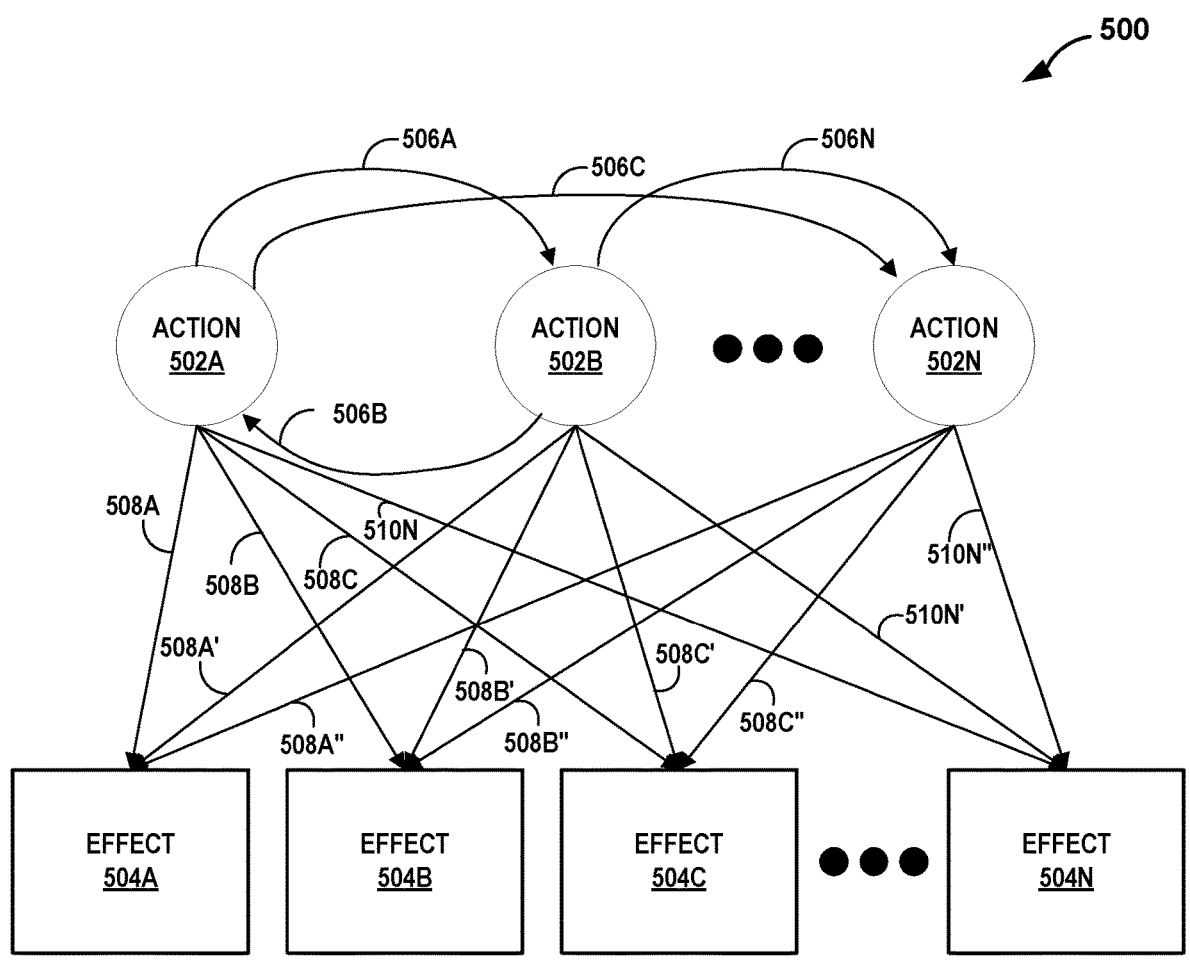
FIG. 5 is a conceptual diagram illustrating an example structure of a threat treatment model, in accordance with one or more aspects of the techniques described herein.

FIG. 5 is a conceptual diagram illustrating an example structure of a threat treatment model, in accordance with one or more aspects of the techniques described herein. In the example threat treatment model 500 of FIG. 5, threat treatment model 500 may include actions 502A-502N (collectively, "actions 502"), effects 504A-504N (collectively, "effects 504"), next action probabilities 506A-506N (collectively, "next action probabilities 506"), and action effect probabilities 508A-508N, 508A'-508N', and 508A"-508N" (collectively, "action effect probabilities 508").

Actions 502 may comprise an activity or step performed by a user when interacting with various network systems to resolve a threat. In the example of FIG. 5, actions 502 may be represented by a circular vertex. As one example, actions 502 may include activities such as downloading a manifest file (e.g., action 502A), performing a backup, blocking traffic to/from a network address (e.g., action 502B), cleaning the infected system (e.g., action 502N), or the like. In some examples, actions 502 may be more granular, such as user interactions with network systems and/or software, such as user clicks or other user behavior. Actions 502 may be linked to other actions (e.g., between actions 502A and 502B) that represent a current and subsequent action pair. In some example implementations, actions 502 may be based on states as described in a Hidden Markov Model (HMM).

Effects 504 may comprise outcomes resulting from the performance of one or more of actions 502. In the example of FIG. 5, effects 504 may be represented by a rectangular vertex. Actions 502 may be linked to effects 504 (e.g., between action 502A and effect 504A) that represent the effect of an action. As one example, action 502A may represent downloading a manifest file and action 502B may represent blocking traffic to/from a network address. As a result of performing action 502A, the manifest file may provide useful information (e.g., effect 504A) to be used for updating configuration in the system. Moreover, as a result of performing action 502B, the system may become safer (e.g., effect 504B). In some examples, effects 504 may not necessarily be immediately apparent, and may include effects of actions 502 that occur after a period of time. In some example implementations, effects 504 may be based on observations as described in HMM.

Next action probabilities 506 may comprise probabilities that a subsequent action was performed after performing a current action. In the example of FIG. 5, next action probabilities 506 may be represented by the link between actions 502. As one example, each of next action probabilities 506 may represent the probability that a first one of actions 502 was subsequently performed as a result of performing a second one of actions 502. Continuing the example above, action 502A may represent downloading a manifest file and action 502B may represent blocking traffic to/from a network address. To calculate next action probabilities 506, the SDN controller may capture the action sequences performed by one or more users based on the threat treatment information obtained. For example, based on threat treatment information obtained, the SDN controller may determine that out of 100 users, 90 users performed action 502B in response to performing action 502A, whereas 10 users performed action 502N (e.g., allowing traffic to/from the network address) in response to performing action 502A. In this example, next action probability 506A may be 90% and next action probability 506C may be 10%. Although illustrated as a numerical value, next action probabilities 506 may be represented in any form, such as by color, shape, size, etc. In some example implementations, next action probabilities 506 may be based on state transition probabilities as described in HMM.

Action effect probabilities 508 may comprise probabilities that a particular effect occurs as a result of performing a specific action. In the example of FIG. 5, action effect probabilities 508 may be represented by the link between actions 502 and effects 504. As one example, each of action effect probabilities 508 may represent the probability that one of effects 504 occurs as a result of performing one of actions 502. Continuing the example above, actions 502B may represent blocking traffic to/from a network address. To calculate action effect probabilities 508, the SDN controller may capture the actions and their effects performed by one or more users based on the threat treatment information obtained. For example, based on threat treatment information obtained, the SDN controller may determine that out of 100 users, 75 users were successful in making the system safer as a result of performing action 502B, while 25 users were unsuccessful (e.g., effect 504C) in making the system safer as a result of performing action 502B. In this example, action effect probability 508B' may be 75% and action effect probability 508C' may be 25%. Although illustrated as a numerical value, action effect probabilities 508 may be represented in any form, such as by color, shape, size, etc. In some example implementations, action effect probabilities 508 may be based on output probabilities as described in HMM.

Figure 6:
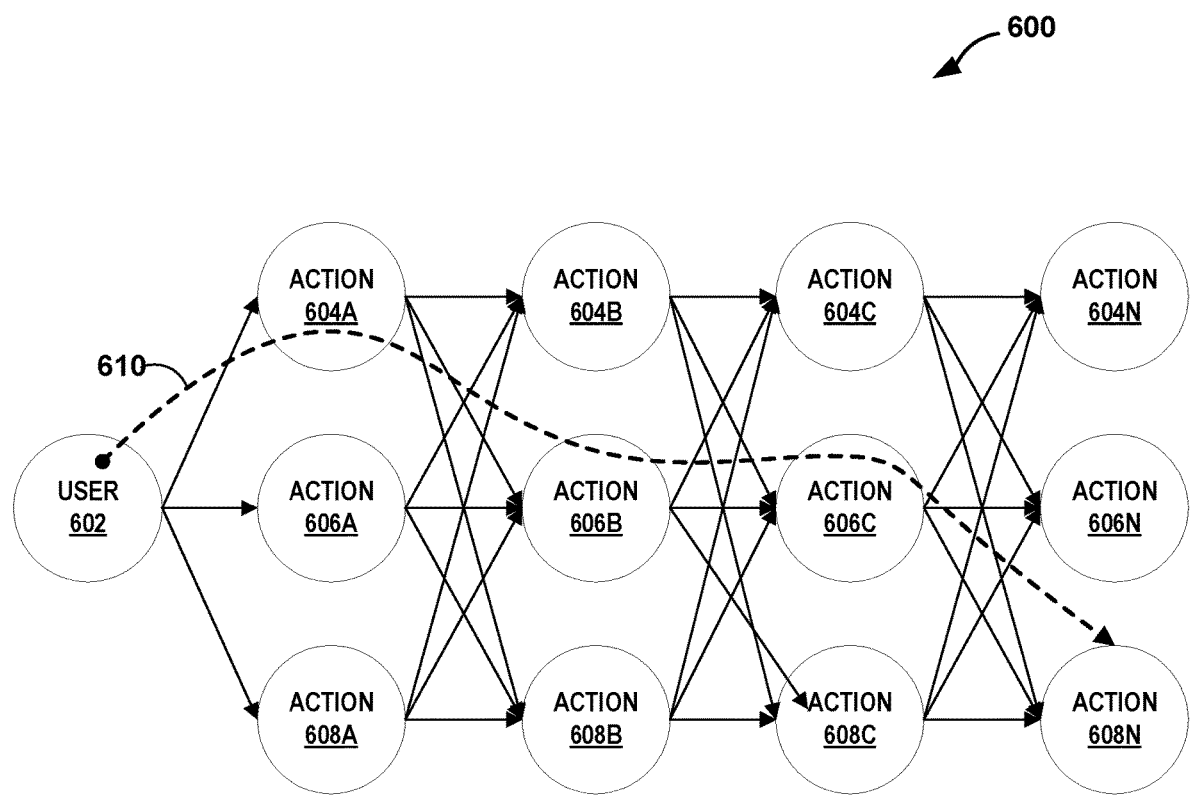
FIG. 6 is a conceptual diagram illustrating an example structure of a threat treatment graph, in accordance with one or more aspects of the techniques described herein.

FIG. 6 is a conceptual diagram illustrating an example structure of a threat treatment graph, in accordance with one or more aspects of the techniques described herein. In the example of FIG. 6, threat treatment graph 600 may illustrate one or more threat treatment processes to be used as a guide for user 602 to resolve a threat. An SDN controller may generate one or more treatment processes by applying a dynamic programming algorithm (e.g., Viterbi algorithm) to a threat treatment model as described in FIG. 5. For example, the SDN controller may generate one or more paths based on the probabilities, actions, and effects defined in the threat treatment model.

In this example, threat treatment graph 600 includes one or more paths each representing a process for which user 602 may perform to resolve a threat. Each path of threat treatment graph 600 may include one or more actions 604A-604N (collectively, "actions 604"), one or more 606A-606N (collectively, "actions 606"), and one or more 608A-608N (collectively, "actions 608"), represented by each of the vertices as illustrated in FIG. 6. For ease of illustration, FIG. 6 is illustrated with only actions 604, 606 and 608, but may include more or less actions.

User 602 may perform any of the actions along a particular path within threat treatment graph 600. In one instance, in response to a threat (e.g., receiving malicious traffic), an SDN controller (e.g., SDN controller 23 of FIG. 1) may generate graph 600. SDN controller 23 may also apply a dynamic programming algorithm (e.g., Viterbi algorithm) to generate an optimal path among the one or more paths in graph 600. Path 610 may represent a respective ordered set of actions for which a user may perform to resolve the threat. To resolve the threat, user 602 may perform one or more actions along path 610. For example, user 602 may initiate the threat treatment process with action 604A, which may represent downloading a manifest file. In the example of FIG. 6, threat treatment graph 600 may indicate that actions 604B, 606B, and 608B may be performed in response to performing action 604A. In this example, user 602 may, in response to performing action 604A, perform action 606B, which may represent performing a backup of the system. User 602 may then perform action 606C, which may represent blocking traffic to/from a network address. User 602 may then perform action 608N, which may represent cleaning the infected system.

User 602 may perform all actions of a path, or may perform a subset of the actions of a path. For example, in some instances, user 602 may perform action 604A, action 606B, and action 606C, but may not perform action 608N. User 602 may perform the actions along a path based on whether user 602 is satisfied with the result of performing the actions along the path.

Figure 7:
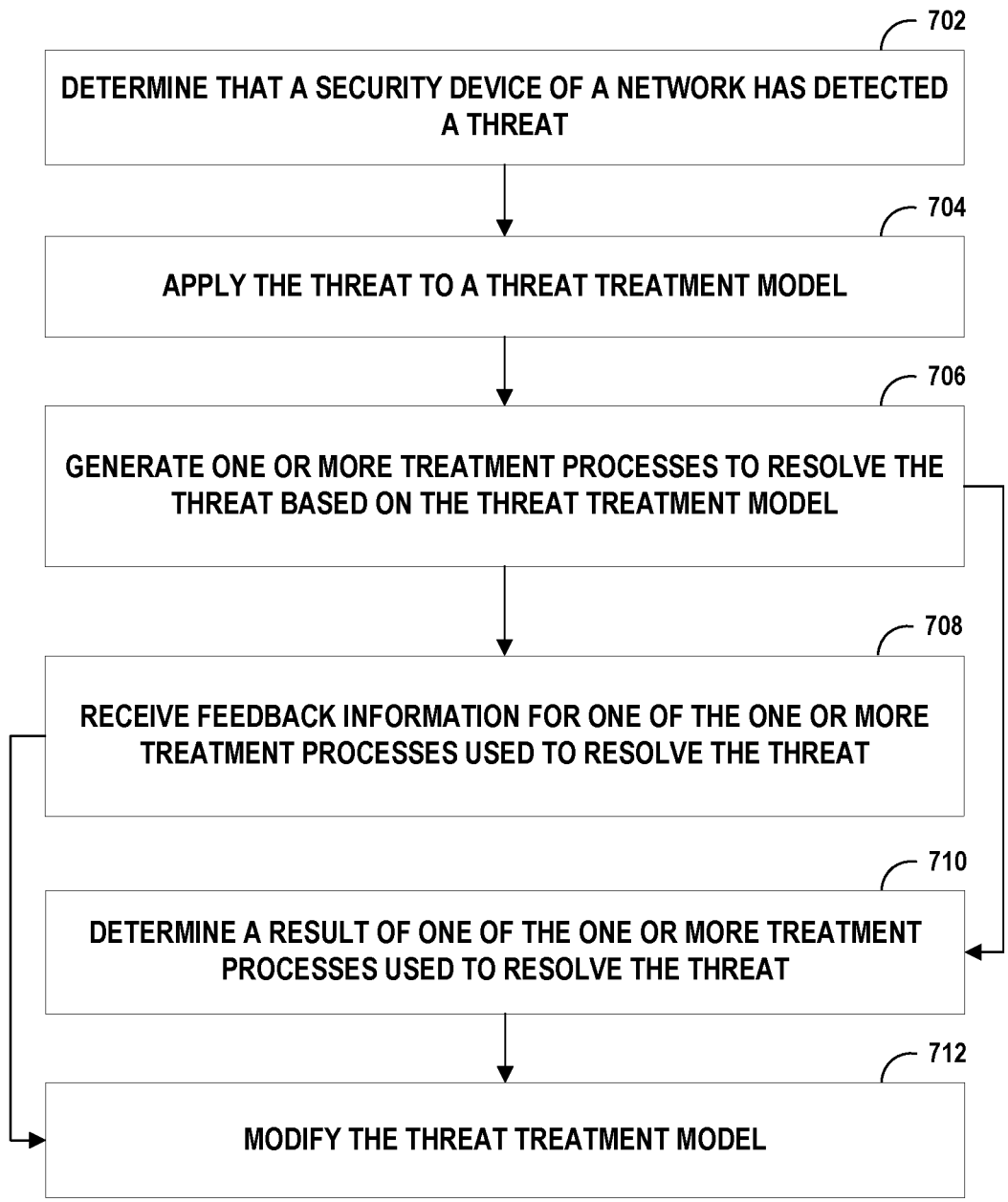
FIG. 7 is a flowchart illustrating an example operation in accordance with the techniques of the disclosure.

FIG. 7 is a flowchart illustrating an example operation in accordance with the techniques of the disclosure. For convenience, FIG. 7 is described with respect to SDN controller 23 of FIGS. 1 and 2. In the example of FIG. 7, SDN controller 23 may determine that a security device of a network has detected a threat (702). For example, security device 26 may detect a threat and may notify SDN controller 23 that a threat has been detected.

In response to determining that a threat has been detected, SDN controller 23 may apply the threat to a threat treatment model (704). For example, SDN controller 23 may generate the threat treatment model based on obtained threat treatment information that includes one or more steps used to resolve previous instances of the same threat or previous instances of similar threats. The threat treatment information may be obtained from one or more of a remote user, a local user, or the current user. Based on the threat treatment information, SDN controller 23 may generate the threat treatment model as a statistical model of the different steps taken to resolve the same or similar threats. For example, SDN controller 23 may generate the threat treatment model based on a machine-learning model, such as Hidden Markov Model (HMM), Reinforcement learning, Temporal learning, Viterbi algorithm, Bayesian Networks, Dynamic Programming, and Markov Decision Process. In some example implementations, the threat treatment model may include a plurality of actions that the one or more users performed to resolve the same or similar threats, one or more effects that define outcomes of the plurality of actions, one or more probabilities of a performance of a corresponding subsequent action of the plurality of actions in response to a performance of a respective action of the plurality of actions (next action probabilities), and one or more probabilities of one or more effects in response to the performance of the respective action of the plurality of actions (action effect probabilities).

SDN controller 23 may generate one or more treatment processes to resolve the threat based on the threat treatment model (706). For example, SDN controller 23 may generate a threat treatment graph that comprises one or more paths. Each of the paths may represent a respective ordered process to resolve the threat. For example, the threat treatment graph may have one or more actions ordered based on the next action probabilities and the action effect probabilities. SDN controller 23 may apply a Viterbi algorithm to the graph to generate an optimal path from the one or more paths. In some examples, SDN controller 23 may present the threat treatment graph with the optimal path on a user interface for which a user may perform one or more actions in accordance with the optimal path indicated in the threat treatment graph. In some examples, SDN controller 23 may automatically generate one or more policies based on the one or more actions of the optimal path and send the policies to security device 26 (e.g., a firewall) or to virtual machines 13 (e.g., an infected endpoint).

In some examples, SDN controller 23 may receive feedback information for one of the one or more treatment processes used to resolve the threat (708). For example, SDN controller 23 may receive feedback on whether one of the one or more treatment processes resolved the threat, and/or whether the user was satisfied with the result of the one of the one or more treatment processes. In some examples, SDN controller 23 may receive more granular feedback, such as feedback for one or more actions of one of the one or more treatment processes. In response, SDN controller 23 may modify the threat treatment model, such as, for example, by regenerating the threat treatment model based on the modification of one or more probabilities of the threat treatment model (712).

In some examples, SDN controller 23 may determine that one of the one or more treatment processes used to resolve the threat was unsatisfactory (710) and in response, may modify the threat treatment model (712).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
   determining that a security device of a network has detected a threat;
   applying the threat to a threat treatment model, wherein the threat treatment model comprises:
     a plurality of actions that one or more users performed to resolve the threat;
     one or more effects that define outcomes of the plurality of actions;
     one or more probabilities of a performance of a corresponding subsequent action of the plurality of actions in response to a performance of a respective action of the plurality of actions; and
     one or more probabilities of one or more effects in response to the performance of the respective action of the plurality of actions;
   generating, based on the threat treatment model, one or more treatment processes to resolve the threat; and
   modifying, based on feedback or a result of performing the one or more treatment processes to resolve the threat, the threat treatment model to refine the one or more treatment processes for resolving a subsequent threat.

2. The method of claim 1, wherein the threat treatment model includes a statistical model of the one or more steps used to resolve previous instances of the threat or previous instances of similar threats.

3. The method of claim 1, further comprising generating the threat treatment model based on the threat treatment information and a machine-learning model comprising at least one of a Hidden Markov Model (HMM), Reinforcement learning, Temporal learning, Viterbi algorithm, Bayesian Networks, Dynamic Programming, Markov Decision Process.

4. The method of claim 1, wherein the one or more treatment processes comprises an optimal path among one or more paths that represents a respective ordered process to resolve the threat.

5. The method of claim 1, wherein generating the one or more treatment processes comprises:
   generating one or more policies to resolve the threat; and
   sending the one or more policies to an endpoint or firewall to resolve the threat.

6. The method of claim 1, further comprising:
   obtaining the threat treatment information from one or more users that previously performed the one or more steps used to resolve the previous instances of the threat or the previous instances of the similar threats; and
   generating the threat treatment model based on the threat treatment information from one or more users that previously performed the one or more steps.

7. The method of claim 6, wherein the one or more users comprise at least one of a local user of the network, a current user of the network, and a remote user to the network.

8. The method of claim 1, wherein modifying the threat treatment model to refine the one or more treatment processes to resolve the subsequent threat comprises:
   modifying the one or more probabilities of the performance of the corresponding subsequent action of the plurality of actions; and
   regenerating the threat treatment model based on the modified one or more probabilities of the performance of the corresponding subsequent action of the plurality of actions.

9. The method of claim 1, wherein the feedback comprises a level of satisfaction of performing the one or more treatment processes to resolve the threat.

10. A software defined networking controller comprising:
    one or more processors, wherein the one or more processors are configured to:
      determine that a security device of a network has detected a threat;
      apply the threat to a threat treatment model, wherein the threat treatment model comprises:
        a plurality of actions that one or more users performed to resolve the threat;
        one or more effects that define outcomes of the plurality of actions;
        one or more probabilities of a performance of a corresponding subsequent action of the plurality of actions in response to a performance of a respective action of the plurality of actions; and
        one or more probabilities of one or more effects in response to the performance of the respective action of the plurality of actions;
      generate one or more treatment processes to resolve the threat based on the threat treatment model; and
      modify, based on feedback or a result of performing the one or more treatment processes to resolve the threat, the threat treatment model to refine the one or more treatment processes for resolving a subsequent threat.

11. The software defined networking controller of claim 10, wherein the threat treatment model includes a statistical model of the one or more steps used to resolve previous instances of the threat or previous instances of similar threats.

12. The software defined networking controller of claim 10, wherein the one or more processors are further configured to generate the threat treatment model based on the threat treatment information and a machine-learning model comprising at least one of a Hidden Markov Model (HMM), Reinforcement learning, Temporal learning, Viterbi algorithm, Bayesian Networks, Dynamic Programming, Markov Decision Process.

13. The software defined networking controller of claim 10, wherein each of the one or more treatment processes comprises an optimal path among one or more paths that represents a respective ordered process to resolve the threat.

14. The software defined networking controller of claim 10, wherein, to generate the one or more treatment processes, the one or more processors are further configured to:
   generate one or more policies to resolve the threat; and
   send the one or more policies to an endpoint or firewall to resolve the threat.

15. The software defined networking controller of claim 10, wherein the one or more processors are further configured to:
   obtain the threat treatment information from one or more users that previously performed the one or more steps used to resolve the previous instances of the threat or the previous instances of the similar threats; and
   generate the threat treatment model based on the threat treatment information from one or more users that previously performed the one or more steps.

16. The software defined networking controller of claim 10, wherein to modify the threat treatment model to refine the one or more treatment processes to resolve the subsequent threat, the one or more processors are further configured to:
   modify the one or more probabilities of the performance of the corresponding subsequent action of the plurality of actions; and
   regenerate the threat treatment model based on the modified one or more probabilities of the performance of the corresponding subsequent action of the plurality of actions.

17. The software defined networking controller of claim 10, wherein the feedback comprises a level satisfaction of performing the one or more treatment processes to resolve the threat.

18. A method comprising:
   determining that a security device of the network has detected a threat;
   determining that a prior instance of the threat or a similar threat does not exist;
   tracking initial threat treatment information that includes one or more steps used to resolve the threat;
   obtaining subsequent threat treatment information that includes one or more steps used to resolve subsequent instances of the threat or subsequent instances of similar threats;
   generating a threat treatment model, wherein the threat treatment model comprises:
      a plurality of actions that one or more users performed to resolve the threat;
      one or more effects that define outcomes of the plurality of actions;
      one or more probabilities of a performance of a corresponding subsequent action of the plurality of actions in response to a performance of a respective action of the plurality of actions; and
      one or more probabilities of one or more effects in response to the performance of the respective action of the plurality of actions; and
   generating, based on the threat treatment model, one or more treatment processes to resolve subsequent instances of the threat or subsequent instances of similar threats; and
   modifying, based on feedback or a result of performing the one or more treatment processes to resolve the threat, the threat treatment model to refine the one or more treatment processes for resolving a subsequent threat.

\* \* \* \* \*